United States Patent
Chowdhury et al.

(10) Patent No.: US 11,113,326 B2
(45) Date of Patent: Sep. 7, 2021

(54) AUTOMATIC EXTRACTION OF DOMAIN SPECIFIC TERMINOLOGY FROM A LARGE CORPUS

(71) Applicant: International Business Machines Corporation, Armonk, NY (US)

(72) Inventors: Md Faisal M. Chowdhury, Corona, NY (US); Sharon M. Trewin, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 15/881,521

(22) Filed: Jan. 26, 2018

(65) Prior Publication Data
US 2019/0236206 A1    Aug. 1, 2019

(51) Int. Cl.
| | | |
|---|---|---|
| G06F 16/33 | (2019.01) | |
| G06F 16/335 | (2019.01) | |
| G06F 16/35 | (2019.01) | |
| G06F 40/30 | (2020.01) | |
| G06F 40/242 | (2020.01) | |
| G06F 40/284 | (2020.01) | |

(52) U.S. Cl.
CPC ........ *G06F 16/3344* (2019.01); *G06F 16/335* (2019.01); *G06F 16/358* (2019.01); *G06F 40/242* (2020.01); *G06F 40/284* (2020.01); *G06F 40/30* (2020.01)

(58) Field of Classification Search
CPC .. G06F 16/3344; G06F 40/284; G06F 40/242; G06F 40/30; G06F 16/358; G06F 16/335
See application file for complete search history.

(56) References Cited

U.S. PATENT DOCUMENTS

| | | | | |
|---|---|---|---|---|
| 8,589,399 B1* | 11/2013 | Lee | ........................ | G06F 16/313 |
| | | | | 707/737 |
| 9,672,279 B1* | 6/2017 | Cohen | ................... | G06F 16/358 |
| 2010/0262454 A1* | 10/2010 | Sommer | ................ | G06Q 30/02 |
| | | | | 706/20 |

(Continued)

OTHER PUBLICATIONS

He et al. "Automatic Discovery of Attribute Synonyms using Query Logs and Table Corpora" p. 1-11 (Year: 2016).*

(Continued)

*Primary Examiner* — Mark D Featherstone
*Assistant Examiner* — Kweku William Halm
(74) *Attorney, Agent, or Firm* — John Noh

(57) ABSTRACT

A method of extracting jargon from a document corpus stored in a database using a processor and a user interface is described herein. A sub-domain input is entered through the user interface to initiate a review of the document corpus stored in the database. The processor separates the document corpus into at least one sub-corpus and a remainder corpus. The at least one sub-corpus is defined by the sub-domain input. A first topic model and a second topic model are built to generate respective topic similarity scores for at least one term extracted from the at least one sub-corpus and at least one corresponding term extracted from the remainder corpus. The respective topic similarity scores are compared by the processor to identify jargon terms and thereby provide a list of jargon terms through the user interface.

20 Claims, 9 Drawing Sheets

(56) References Cited

U.S. PATENT DOCUMENTS

| | | | | |
|---|---|---|---|---|
| 2011/0238409 | A1* | 9/2011 | Larcheveque | G06F 16/355 |
| | | | | 704/9 |
| 2012/0239668 | A1* | 9/2012 | Bhattacharyya | G06F 40/30 |
| | | | | 707/754 |
| 2012/0245923 | A1* | 9/2012 | Brun | G06F 40/242 |
| | | | | 704/9 |
| 2013/0103389 | A1* | 4/2013 | Gattani | G06F 40/40 |
| | | | | 704/9 |
| 2014/0095411 | A1* | 4/2014 | Lamba | G06F 40/30 |
| | | | | 706/12 |
| 2016/0104075 | A1 | 4/2016 | Chowdhury et al. | |
| 2016/0148114 | A1* | 5/2016 | Allen | G06N 20/00 |
| | | | | 706/11 |
| 2016/0148116 | A1 | 5/2016 | Bornea et al. | |

OTHER PUBLICATIONS

Md. Faisal Mahbub Chowdhury, "Improving the Effectiveness of Information Extraction from Biomedical Text," PhD Dissertation, DIT—University of Trento, Apr. 2013, pp. 1-165.

Alfio Gliozzo et al., "JoBimText Visualizer: A Graph-based Approach to Contextualizing Distributional Similarity," Proceedings of the TextGraphs-8 Workshop, Oct. 18, 2013, pp. 6-10.

Steffan Corley et al., "Finding Syntactic Structure in Unparsed Corpora," Computers and the Humanities, vol. 35, No. 2, 2001, pp. 81-94.

* cited by examiner

AUTOMATIC EXTRACTION OF DOMAIN SPECIFIC TERMINOLOGY FROM A LARGE CORPUS

TECHNICAL FIELD

The present invention relates to systems, methods, and computer program products for automatic extraction of domain-specific terminology from a document corpus. More specifically, the invention relates to a method of extracting jargon from a sub-domain within a heterogeneous document corpus by building distinct topic models to identify and compare characteristics of terminology in different corpora.

BACKGROUND

Extracting domain-specific terminology from a collection of documents is a valuable tool in various human and machine analyses, such as facilitating knowledge acquisition, translation, standardization, localization, or compiling technical documents. Nevertheless, existing systems, methods, and computer program products fail to sufficiently differentiate between sub-domains within the extracted terms and often include additional noise in the generated results due to difficulty by processing equipment in separating sub-domains. For instance, certain methods are performed by comparing extracted terminology against a large general-purpose document corpus and identifying terms that are infrequent in the large corpus but more frequent in a specialized corpus. As such, these methods rely on the availability of a large, general-purpose document corpus and on the assumption that important domain-specific terms (i.e., jargon terms) are rare within the corpus.

Another method includes extracting terms from a domain-specific corpus and mapping the terms to embeddings, such as vectors representing the terms in a multidimensional space. The embeddings are used to divide terms into sub-domains by identifying clusters of terms based on topic similarity. However, these terms are not necessarily jargon in the sub-domain. For example, "Manchester" might have similarity to the sub-domain "soccer" because there are two clubs in that city but it is not part of the jargon for soccer. In addition, the embeddings method relies on the availability of mapping, which likewise relies on a large general-purpose document corpus that must include the target terms. In specialized domains, target terms may not appear in the large document corpus at all and specialized corpora are often too small for a processor to generate reliable embeddings. Consequently, identifying sub-domains based on the embeddings method may not be feasible in certain instances.

What is needed is a system, method, and computer program product for accurately identifying and extracting jargon terms in a sub-domain without reference to a large, general-purpose document corpus, such as when several smaller corpora are available from different sources, as is often the case in specialized domains.

SUMMARY

An embodiment of the present invention provides a method of extracting jargon from a document corpus stored in a database using a processor and a user interface. The processor receives a sub-domain input through the user interface and initiates a review of the document corpus stored in the database by separating the document corpus into at least one sub-corpus and a remainder corpus. The remainder corpus is defined by the document corpus less the at least one sub-corpus. A first topic model is built to evaluate a term extracted from the at least one sub-corpus and a second topic model is built to evaluate a corresponding term extracted from the remainder corpus. Respective topic similarity scores for the extracted terms are provided by the first topic model and the second topic model and are further compared by the processor to identify at least one jargon term. A list of jargon terms including the at least one jargon term identified by the processor is provided through the user interface.

More specifically, given a large corpus of domain-specific documents, such as compliance regulations or medical abstracts, that include documents of different sub-domains (e.g., regulations for batteries, regulations for banking, etc. or abstracts related to immunology, abstracts related to pediatrics, etc.) the invention provides an unsupervised method for identifying jargon terminology within the document corpus. In other words, sub-domain/jargon term extraction according to the present invention results in improved computer functionality as it provides a deeper, more specific level of extracted information with reduced noise. Jargon terms may then be used, for example, to build domain-specific glossaries or ontologies, generate a visualization of the domain, or grouped together to build other resources.

When a user inputs a search query with many terms into an interface, a large set of results is often returned from the corpus. While conventional searching methods may provide a top-ranked result, the present invention can be used to explore a particular topic more thoroughly by providing search results having terms of interest within the sub-domain. Specifically, the sub-domain input is first used to build a topic model to narrow the document corpus into relevant documents and then used to identify and extract jargon terminology from the document cluster. This provides improved functionality to conventional key word searching, which is not able to verify whether the generated results are actually within the sub-domain of interest. Thus, the identification of jargon not only provides a broader search vocabulary for further sub-questions and theses to the original query but it is also able to facilitate entity resolution (e.g., politicians and athletes with the same name can be resolved correctly using a "sports" sub-domain).

In at least one embodiment, the invention provides a method of extracting jargon from a document corpus stored in a database using a processor and a user interface, the method comprising: receiving a sub-domain input by the processor through the user interface to initiate a review of the document corpus stored in the database; separating the document corpus into at least one sub-corpus and a remainder corpus by the processor, the at least one sub-corpus defined by the sub-domain input, the remainder corpus defined by the document corpus less the at least one sub-corpus; building a first topic model to evaluate at least one term extracted from the at least one sub-corpus and a second topic model to evaluate at least one corresponding term extracted from the remainder corpus; generating respective topic similarity scores for the at least one term and the at least one corresponding term by the first topic model and the second topic model; comparing the respective topic similarity scores by the processor to identify at least one jargon term; and providing a list of jargon terms including the at least one jargon term through the user interface.

In a further embodiment, the method ranks the at least one jargon term according to a minimum difference between the respective topic similarity scores of the first topic model and the second topic model; and provides a document cluster from the at least one sub-corpus, each document in the document cluster including the at least one jargon term from the list of jargon terms. In a further embodiment, the method selects the document cluster from the at least one sub-corpus; and tagging the document cluster to correspond to the sub-domain input. In a further embodiment to any previous embodiment, the method that separates the document corpus into the at least one sub-corpus and the remainder corpus further includes defining the at least one sub-corpus by at least one of a distributional semantic method or individual user selection. In a further embodiment to the previous embodiment, the distributional semantic method includes building an initial topic model from the document corpus to provide the at least one sub-corpus; and filtering documents in the at least one sub-corpus according to select parameters to define a condensed corpus.

In a further embodiment to any previous embodiment, the method includes associating an individual document with a plurality of sub-corpora. In a further embodiment to the previous embodiment, building the initial topic model further includes selectively excluding a document term from the initial topic model when the document term is at least one of functional or comprises a frequency count below a pre-determined minimum or selectively excluding a document from the initial topic model when fewer than a select number of terms in the document exceed the pre-determined minimum frequency count.

In a further embodiment to any previous embodiment, the at least one sub-corpus is provided by obtaining a vector for the sub-domain input from the initial topic model; mapping document terms to corresponding vectors in the initial topic model to determine an initial topic similarity score relative to the sub-domain input; and providing at least one document where the initial topic similarity score exceeds a particular value for a select number of terms in the at least one document. Further to the previous embodiment, obtaining the vector for the sub-domain input further includes at least one of locating the sub-domain input or averaging the corresponding vectors of each mapped document term to provide an aggregate vector for the at least one document; and including the at least one document in the condensed corpus when a distance between the aggregate vector and the sub-domain input vector is less than a select minimum distance. In an alternative embodiment, obtaining the vector for the sub-domain input further includes: using a proxy vector when the sub-domain input is not found in the initial topic model, the proxy vector defined by averaging vectors of few alternative terms significant to the sub-domain input; and including the at least one document in the condensed corpus when a distance between the proxy vector and an aggregate vector is less than the select minimum distance.

In a further embodiment to any previous embodiment, the method further includes extracting terms from each of the at least one sub-corpora independently of each other. In a further embodiment to the previous embodiment, the method includes extracting the at least one term by at least one of term frequency-inverse document frequency, residual inverse document frequency, term frequency, average term frequency, chi-square, c-value, mapping the at least one term to an embedding, or comparing term frequency in the at least one sub-corpus to term frequency in the remainder corpus. In a further embodiment to either of the previous embodiments, the method includes building the first topic model to evaluate the at least one term from the condensed corpus; and building the second topic model to evaluate the at least one corresponding term from the document corpus less the condensed corpus.

In at least one further embodiment to any of the previous embodiments, the at least one jargon term is identified by defining the respective topic similarity scores based on the condensed corpus and the document corpus less the condensed corpus; and filtering non-jargon terms defined by a minimum difference between the respective topic similarity scores being below a pre-determined threshold. Further to the previous embodiments, the method includes identifying at least one of a characteristic or usage of non-filtered terms that is different in the condensed corpus than in the document corpus less the condensed corpus, the at least one of the characteristic or usage being indicative of the at least one jargon term.

In a further embodiment to any of the previous embodiments, the method includes reducing the ranking of the at least one jargon term when at least one of a frequency count of the at least one jargon term is higher in an alternative sub-domain or a difference between the frequency count of the sub-domain and the alternative sub-domain is less than a select threshold.

Another embodiment of the invention includes a system for extracting jargon from a document corpus, the system including a database storing the document corpus; an interface electrically connected to said database, said interface configured to receive a request to initiate a review of the document corpus based on a sub-domain input and provide a list of jargon terms; and a processor in communication with said database and said interface, said processor having a review module configured to review the document corpus in response to an initiation by said interface; a separation module configured to separate the document corpus into at least one sub-corpus defined by the sub-domain input and a remainder corpus defined by the document corpus less the at least one sub-corpus; a topic model module configured to build a first topic model to evaluate at least one term extracted from the at least one sub-corpus and a second topic model to evaluate at least one corresponding term extracted from the remainder corpus; a similarity score module configured to generate and compare respective topic similarity scores for the at least one term and the at least one corresponding term by the first topic model and the second topic model to identify at least one jargon term; and a term extraction module configured to extract at least one jargon term to provide the list of jargon terms through the user interface.

Another embodiment of the invention includes a computer program product for extracting jargon from a document corpus, the computer program product including: a computer readable storage medium having stored thereon: first program instructions executable by a processor to cause the processor to receive a sub-domain input to initiate a review of the document corpus stored in the database; second program instructions executable by the processor to cause the processor to separate the document corpus into at least one sub-corpus and a remainder corpus, wherein the at least one sub-corpus defined by the sub-domain input and the remainder corpus defined by the document corpus less the at least one sub-corpus; third program instructions executable by the processor to cause the processor to build a first topic model to evaluate at least one term extracted from the at least one sub-corpus and a second topic model to evaluate at least one corresponding term extracted from the remainder corpus; fourth program instructions executable by the processor to cause the processor to generate respective topic similarity scores for the at least one term and the at least one corresponding term by the first topic model and the second topic model; fifth program instructions executable by the processor to cause the processor to compare the respective topic similarity scores to identify at least one jargon term; and sixth program instructions executable by the processor to cause the processor to provide a list of jargon terms including the at least one jargon term through a user interface. In a further embodiment to the previous embodiment, the computer program product further having seventh program instructions executable by the processor to cause the processor to identify the at least one jargon term by at least one of filtering the extracted terms when a minimum difference between the respective topic similarity scores is below a pre-determined threshold or identifying at least one of a characteristic or usage of the extracted terms that is different in the sub-corpus than in the remainder corpus.

DETAILED DESCRIPTION

The invention disclosed herein provides an improvement to the way in which computer technology identifies and extracts jargon terminology from a corpus. That is, terms which are used differently in a particular context or which have a specific meaning that may not be well understood outside that context, for example, "goal" in soccer or "activation" in molecular biology. Since such terms are not necessarily rare in a large heterogeneous document corpus, the invention is practiced using, for example, the methods illustrated in FIGS. 1-3 that collectively improve the accuracy of jargon term identification and extraction by computer processing equipment. FIGS. 4A and 4B illustrate examples of systems that may be used to perform the methods illustrated in FIGS. 1-3.

First, a sub-domain input is entered (or received) 102 through a user interface to identify documents from a document corpus stored in a database 100 that are related to the sub-domain input. Alternatively, the system also receives a document corpus through the user interface. Second, terms are extracted independently from the related documents (i.e., sub-corpus) 202 and the remaining documents 204 in the larger corpus using distributional semantic technologies. Third, distinct topic models (300, 302) are built for the sub-corpus and the remaining documents from the larger corpus to identify terms having different meanings or usages in different contexts 308. These terms are provided through the interface as jargon terms for the sub-domain.

Figure 1:
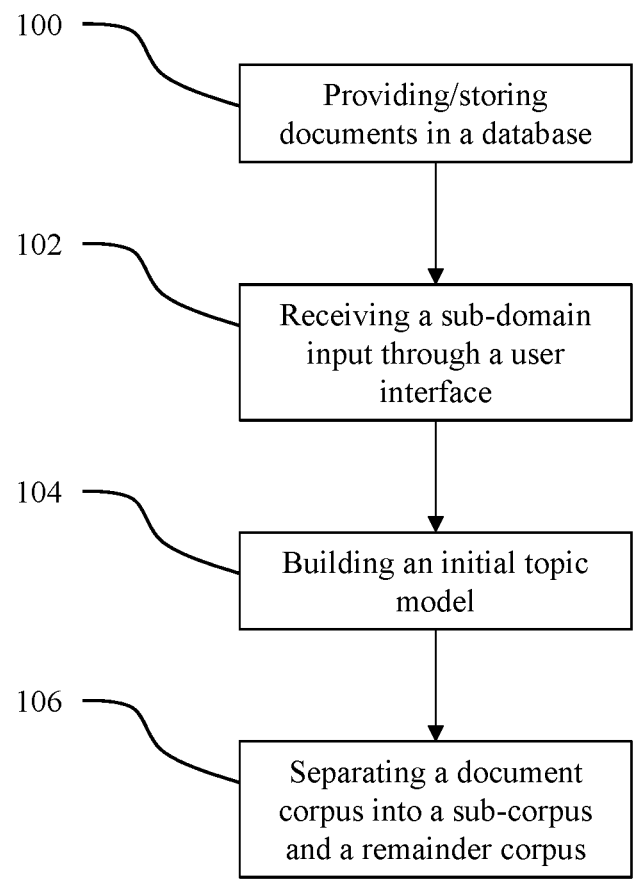
FIG. 1 illustrates a method in accordance with an embodiment of the invention.

With reference to FIG. 1, a document corpus having documents from different sub-domains, such as a collection of news or research articles or document (or file) collections, is provided to a database 100 and stored therein. A user inputs a sub-domain name of interest 102 into the user interface, for example "cricket", to initiate a review of the document corpus by the system. Documents relevant to the sub-domain input (e.g., all news articles related to cricket) are separated 106 from the remaining documents of the document corpus into one or more sub-corpora by the system. In some embodiments, an individual document is included in a plurality of sub-corpora/document clusters. Any remaining documents not included in a sub-corpus define a remainder corpus.

In order to separate the document corpus into at least one sub-corpus, an initial topic model 104 is built for the document corpus (e.g., the news article corpus) using a distributional semantic method, such as latent semantic analysis or latent dirichlet allocation. The initial topic model represents terms in the document corpus as vectors. For increased efficiency the system may be optionally configured to selectively exclude functional and/or infrequent terms from the initial topic model. Infrequent terms include terms having a frequency count below a predetermined minimum (e.g., a frequency count less than 3). The system may also be optionally configured to selectively exclude whole documents from the initial topic model when fewer than a select number of terms in the document exceed the predetermined minimum frequency count (e.g., N<5, where N is equal to the number of terms). In an alternative embodiment, the documents corpus is separated into clusters of related documents/sub-corpora based on identifier information associated with the document or how the documents were loaded into the system if pre-grouped into sub-corpora.

The sub-domain input is searched for in the initial topic model by the system by obtaining a vector for the sub-domain input and mapping terms in specific documents to corresponding vectors in the initial topic model. This process provides an initial topic similarity score relative to the sub-domain input. If the sub-domain input exists in the initial topic model, all documents are identified for which at least N terms (e.g., N=5) have a high topic similarity score (e.g., 0.90) with respect to the sub-domain input. In the above example, the term "cricket" would be mapped to a vector in the initial topic model and documents having at least N terms (e.g., N=5) having a high topic similarity score to "cricket" would be provided. Thus, it might be expected that the terms "run", "over", "wicket" and "bowl" would be identified as terms with a high initial topic similarity score to the sub-domain input "cricket". Documents including at least the select number of such terms (N) would be identified by the processor as candidate documents for the "cricket" domain.

For each candidate document having a high initial topic similarity score, an aggregate vector is formed by at least one of locating the sub-domain input or averaging corresponding vectors of each mapped term in the candidate document. A distance between the aggregate vector and the sub-domain vector is used to define the initial topic similarity score. If the calculated distance is less than a select minimum distance such that the initial topic similarity score is lower than a select parameter (e.g., 0.50), the candidate document is filtered from the sub-corpus back into the remainder corpus. The remaining, unfiltered documents in the sub-corpus having an initial topic similarity score for a select number of terms in each document that exceeds a particular value are used to define a condensed corpus.

In an alternative embodiment, if the sub-domain input is not found in the initial topic model, a few alternative terms (e.g., 3 terms) are entered into the interface that are of high significance to the sub-domain input, for example, in the cricket sub-domain these terms might include "umpire", "run", and "test match". A proxy vector is formed by averaging the vectors of the few alternative terms and used in place of the sub-domain vector to determine a distance between the proxy vector and the aggregated vector. If the distance is less than the select minimum distance, the document is included in the condensed corpus. Otherwise, it is further filtered back into the remainder corpus.

Figure 2:
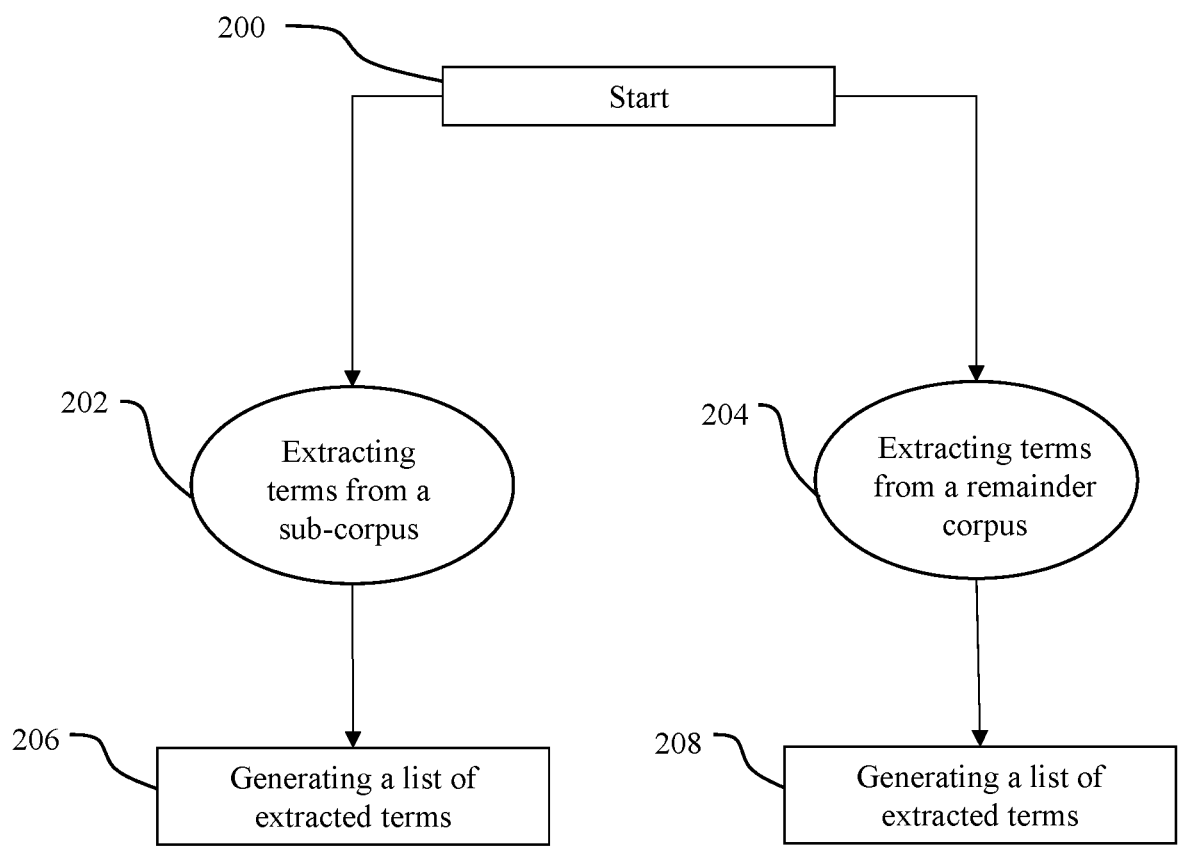
FIG. 2 illustrates a further method in accordance with an embodiment of the invention.

With reference to FIG. 2, the method starts 200 with terminology extraction being performed independently from each of the at least one sub-corpus 202 and the remainder corpus 204. The terms are extracted from the documents in their respective corpora using methods such as term frequency-inverse document frequency, residual inverse document frequency, term frequency, average term frequency, chi-square, c-value, mapping the term to an embedding, or comparing term frequency in the at least one sub-corpus to term frequency in the remainder corpus. In the above example, this process would generate a list of extracted terms 206 used in articles about "cricket" and a list of extracted terms used in the remainder corpus 208.

Figure 3:
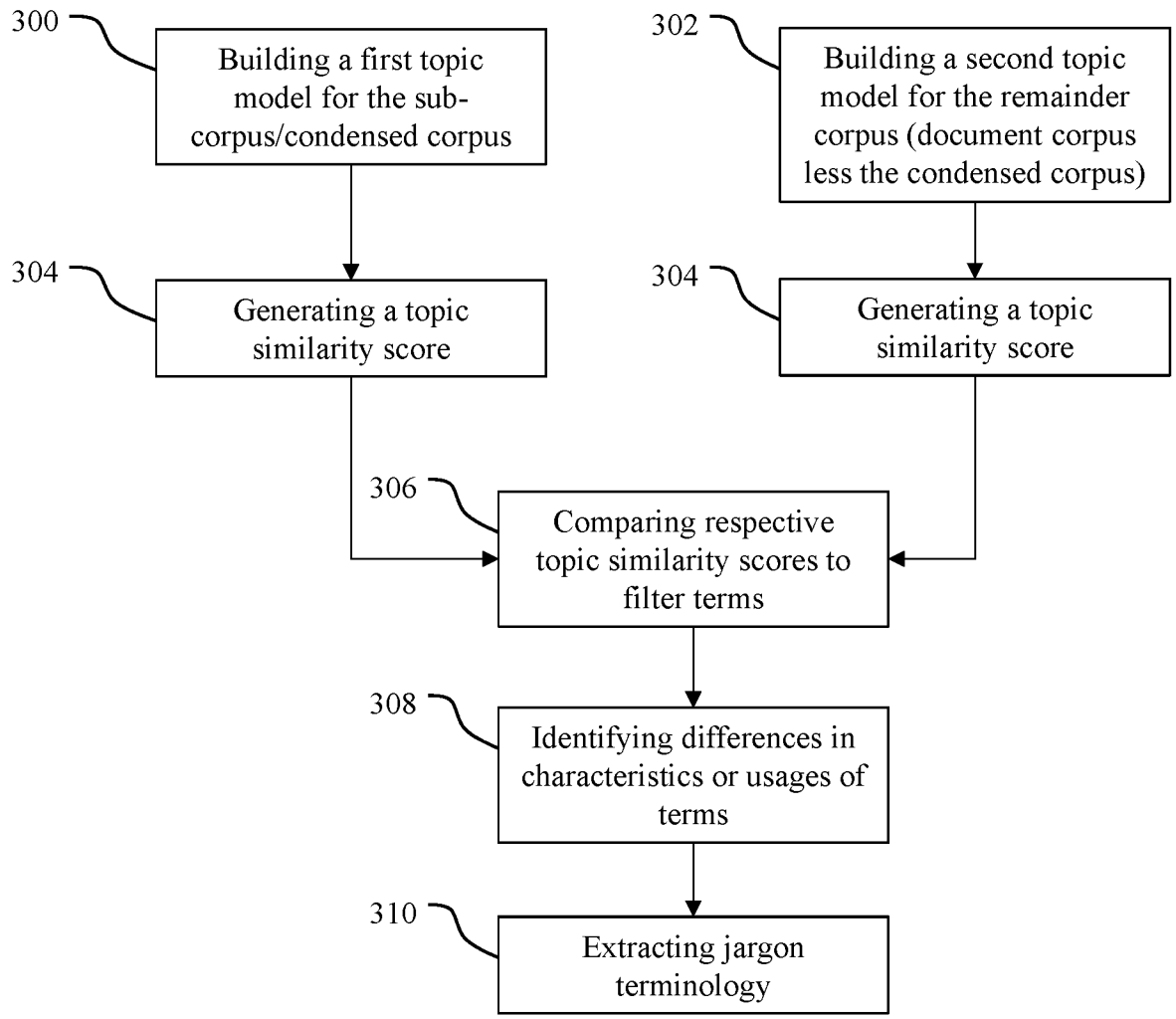
FIG. 3 illustrates a further method in accordance with an embodiment of the invention.
Figure 4A:
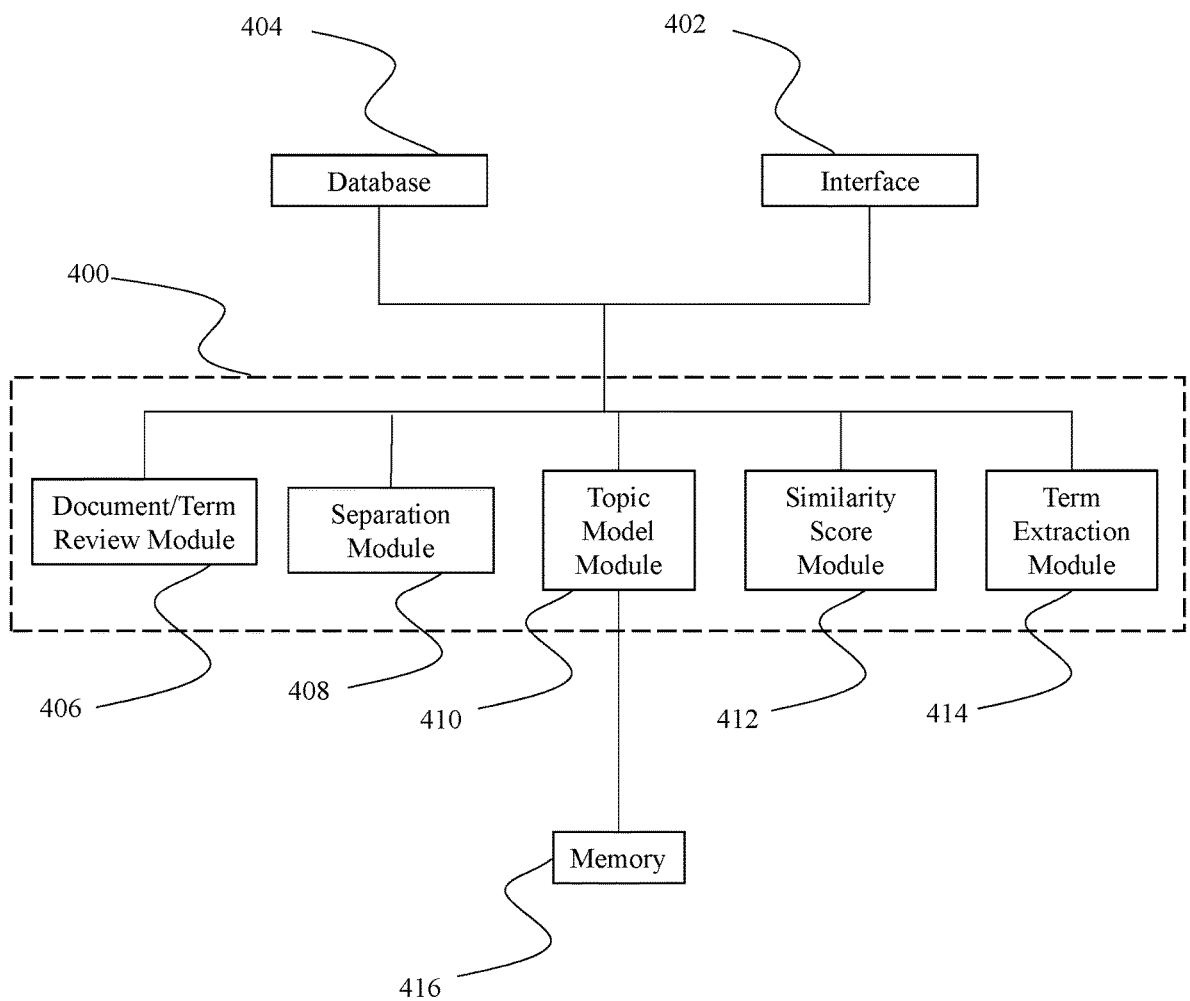
FIG. 4A illustrates a system in accordance with an embodiment of the invention.
Figure 4B:
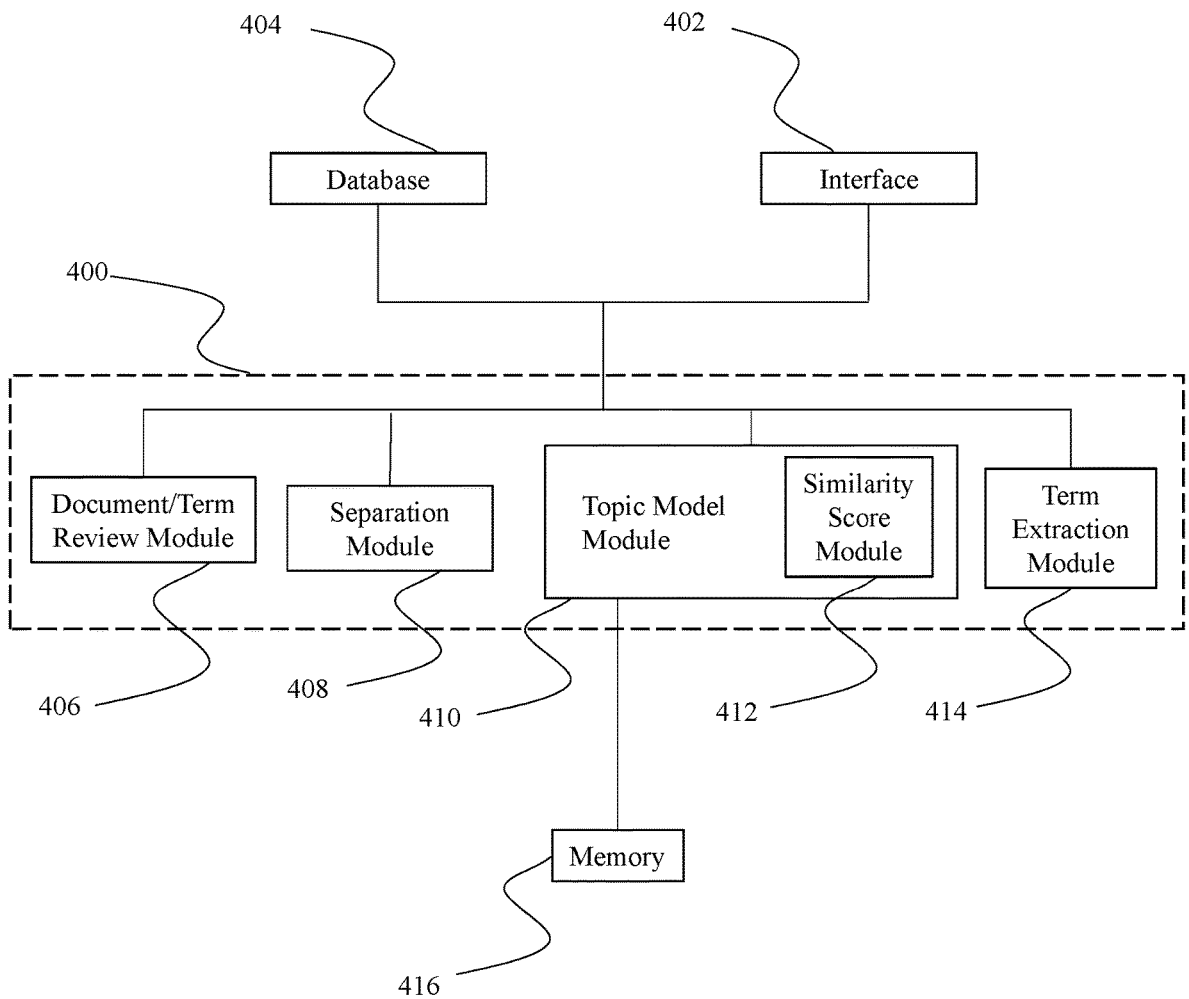
FIG. 4B illustrates an alternative system in accordance with an embodiment of the invention.

With reference to FIG. 3, a first topic model 300 and a second topic model 302 are built to determine whether a term in the at least one sub-corpus is a jargon term having a specific meaning or usage in one or more sub-domains. This determination may be based on parts of speech, related terms, and/or linguistic context. For example, the term "run" is used differently in articles related to "cricket" than in "non-cricket" articles. In contrast, the term "day" would be excluded from a list of jargon terms because it is not used in a unique way in articles related to "cricket". In particular, the first topic model 300 is built to evaluate a term extracted from the at least one sub-corpus, which in some embodiments is defined as a condensed corpus, and the second topic model 302 is built to evaluate a corresponding term extracted from the remainder corpus, which in some embodiments is defined as the documents corpus less the condensed corpus. In the cricket example, the first topic model 300 would include terms from documents related to "cricket" and the second topic model 302 would include terms from documents that were not identified as being related to "cricket". In at least one embodiment, the first and second topic models (300, 302) are built according to the same method used to build the initial topic model 104.

For each term in the list of terminology extracted from the sub-corpus/condensed corpus and each corresponding term extracted from the remainder corpus/document corpus less the condensed corpus, respective topic similarity scores are generated 304 by methods such as term frequency-inverse document frequency. The respective topic similarity scores are then compared against each other by the system and if a minimum difference between the scores is below a predetermined threshold, the term is filtered from the list of extracted terms 306, as terms having close topic similarity scores in each of the first and second topic models is indicative of common, non-jargon terminology.

Each of the remaining terms in the list of extracted terms are further evaluated to determine whether they include a property, characteristic, and/or usage consistently different in the sub-corpus/condensed corpus and the remainder corpus/document corpus less the condensed corpus 308 (i.e., this difference being indicative of a jargon term). For example, the term "run" is often used as a noun in "cricket" documents but is predominately used as a verb in "non-cricket" documents. Another example is that the term "pitcher" would be used very differently in baseball documents than in a general document corpus. All terms in the list of extracted terms are tested and if no linguistic differences are identified, the term is further filtered. Any remaining terms left unfiltered from the list of extracted terms are identified as jargon terms 310 and provided through the user interface as a list of jargon terms for a given sub-domain.

In at least one embodiment, extracted jargon terminology included in the list of jargon terms are subsequently ranked/re-ranked according to their relative importance in a plurality of sub-corpora having other sub-domain terminologies. The ranking is generally based on a minimum difference between the respective topic similarity scores of the first topic model and the second topic model. However, the ranking of a jargon term may be reduced when a frequency count of the jargon term is higher in an alternative sub-domain or a difference between the frequency count of the sub-domain and the alternative sub-domain is less than a select threshold. A document cluster is then provided from the at least one sub-corpus/condensed corpus in which each document includes a jargon term from the list of jargon terms generated according to at least one embodiment of the invention. The document cluster from the sub-corpus/condensed corpus is selectable by the user through the interface and may be tagged to correspond to the sub-domain input.

FIGS. 4A-B illustrate system embodiments that may be used to perform the above-described methods. The system illustrated in FIG. 4A includes a processor 400 in communication with an interface 402 and a database 404. The processor 400 includes a plurality of modules for providing a list of jargon terms through the user interface 402 from a document corpus stored in the database 404. The plurality of modules includes a document/term review module 406, a separation module 408, a topic model module 410, a similarity score module 412, and a term extraction module 414. In an alternative embodiment, the modules are connected to each other by separate links, as opposed to the illustrated busbar, including both direct links between two of the individual modules and indirect links through a third module.

The document/term review module 406 reviews documents from a corpus to identify a list of documents related to the sub-domain input. In at least one embodiment, the review module uses an initial topic model built by the topic model module 410 to define the review. The topic model module 410 may exclude terms identified by the review module 406 as functional and/or infrequent terms when building topic models, such as the initial topic model. The separation module 408 separates the related documents into at least one sub-corpus by filtering documents into a remainder corpus that were not identified as related to the sub-domain input. In at least one embodiment, the separation module 408 further filters the documents into the remainder corpus when a select number of terms in a document does not exceed a minimum frequency count.

The term extraction module 414 extracts terms from the initial topic model and provides the terms to the topic similarity module 412. The topic similarity module 412 maps the terms to vectors in the initial topic model to generate a topic similarity score based on a difference between select vectors. In at least one embodiment, if the difference between the select vectors is below a certain threshold, the separation module 408 filters the document from the sub-corpus. The term extraction module 414 subsequently extracts terms from the sub-corpus and the remainder corpus independently to provide a list of respectively extracted terms to the topic model module 410.

The topic model module 410 then builds a first topic model for the extracted terms of the sub-corpus and a second topic model for the extracted terms of the remainder corpus. In an alternative embodiment, the topic model module 410 includes or is separated into an initial topic model module, a first topic model module, and a second topic model module. In at least one embodiment, the parameters used to define a particular model are retrieved from a memory 416 that in a further embodiment stores the database 404. In an alternative embodiment, the topic module 410 is divided into two or three different or sub-modules where each is dedicated to a particular topic model.

The topic similarity module 412 queries the first and second topic models to generate respective topic similarity scores. In the embodiment illustrated in FIG. 4B, the topic similarity score module 412 is a sub-component to the topic model module 410 that makes an internal query to generate a topic similarity score using the topic model module 410 when a topic model, such as the first, second, or initial topic model. The review module 406 compares the respective topic similarity scores of the extracted terms and if the difference is below a predetermined threshold, the separation module 408 filters the term. The review module 406 further identifies whether the remaining extracted terms have characteristics that are consistently different in the first and second topic models generated by the topic model module 410. The separation module 408 filters terms having no linguistic difference identified by the review module 406. The extraction module 414 extracts the remaining terms from the list to provide a list of jargon term through the user interface.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
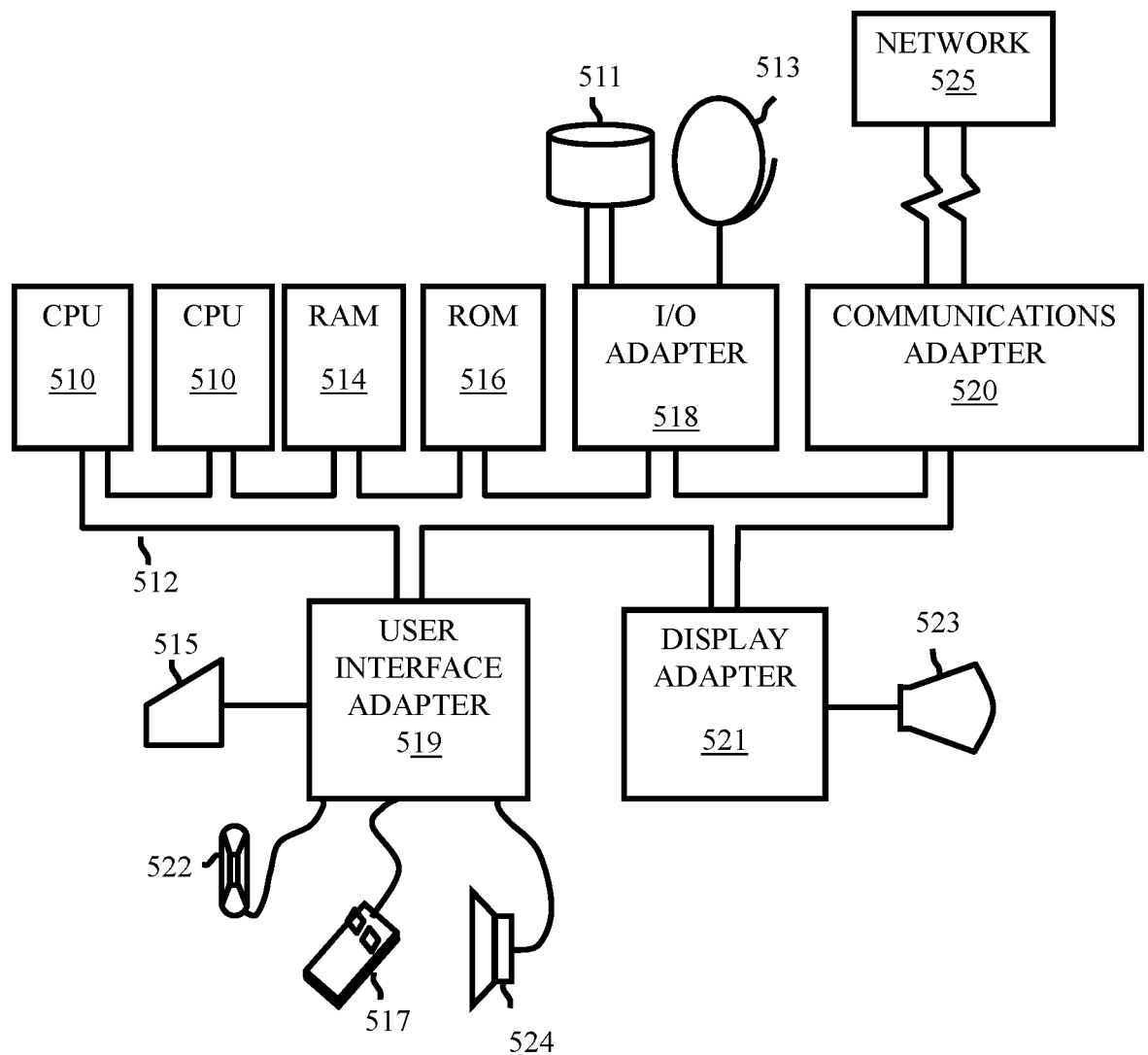
FIG. 5 is a diagram illustrating a computer program product for automatic extraction of domain-specific terminology from a document corpus according to an embodiment of the invention.

With reference to FIG. 5, a representative hardware environment for practicing at least one embodiment of the invention is illustrated. This schematic drawing illustrates a hardware configuration of an information handling/computer system in accordance with at least one embodiment of the invention. The system comprises at least one processor or central processing unit (CPU) 510. The CPUs 510 are interconnected with system bus 512 to various devices such as a random access memory (RAM) 514, read-only memory (ROM) 516, and an input/output (I/O) adapter 518. The I/O adapter 518 can connect to peripheral devices, such as disk units 511 and tape drives 513, or other program storage devices that are readable by the system. The system can read the inventive instructions on the program storage devices and follow these instructions to execute the methodology of at least one embodiment of the invention. The system further includes a user interface adapter 519 that connects a keyboard 515, mouse 517, speaker 524, microphone 522, and/or other user interface devices such as a touch screen device (not shown) to the bus 512 to gather user input. Additionally, a communication adapter 520 connects the bus 512 to a data processing network 525, and a display adapter 521 connects the bus 512 to a display device 523 which may be embodied as an output device such as a monitor, printer, or transmitter, for example.

While it is understood that the process software may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
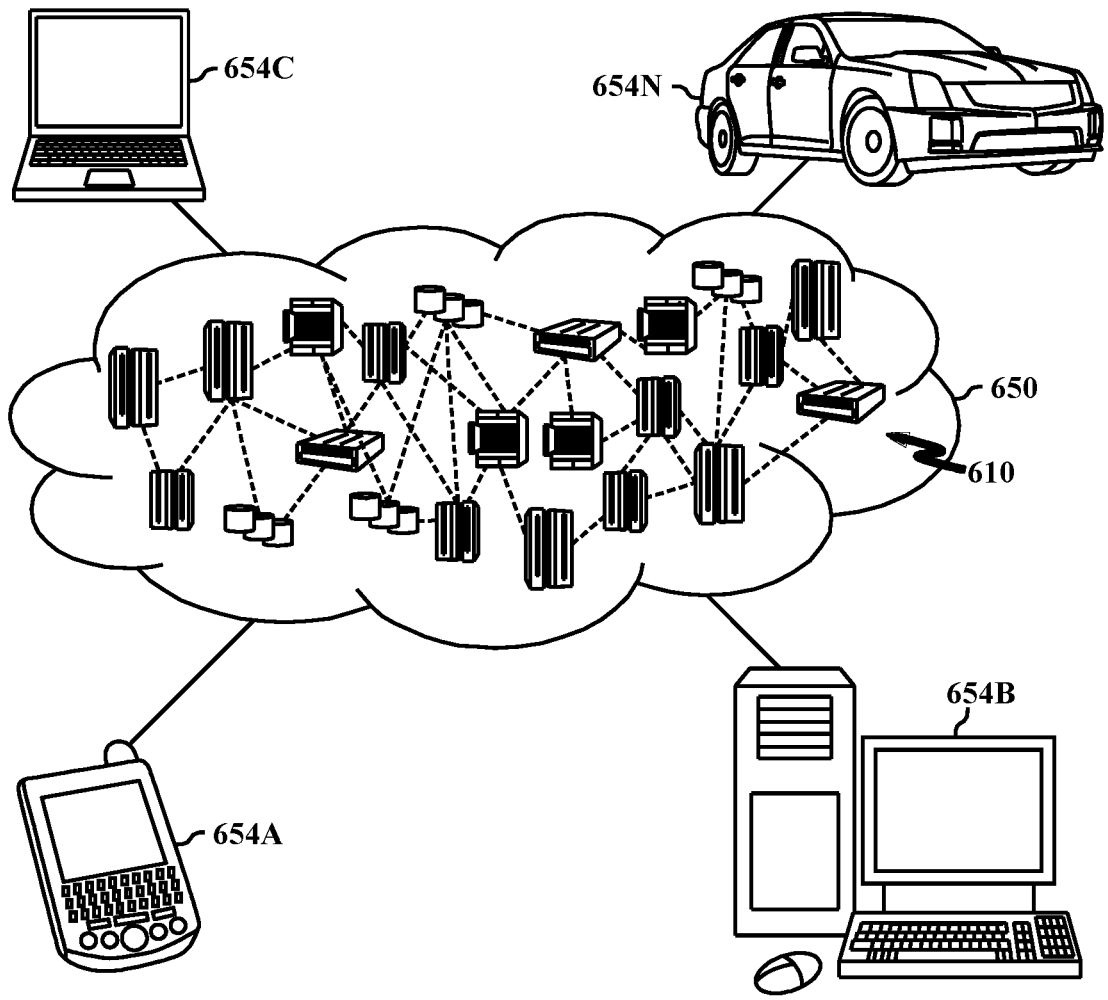
FIG. 6 illustrates a cloud computing environment according to an embodiment of the invention.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
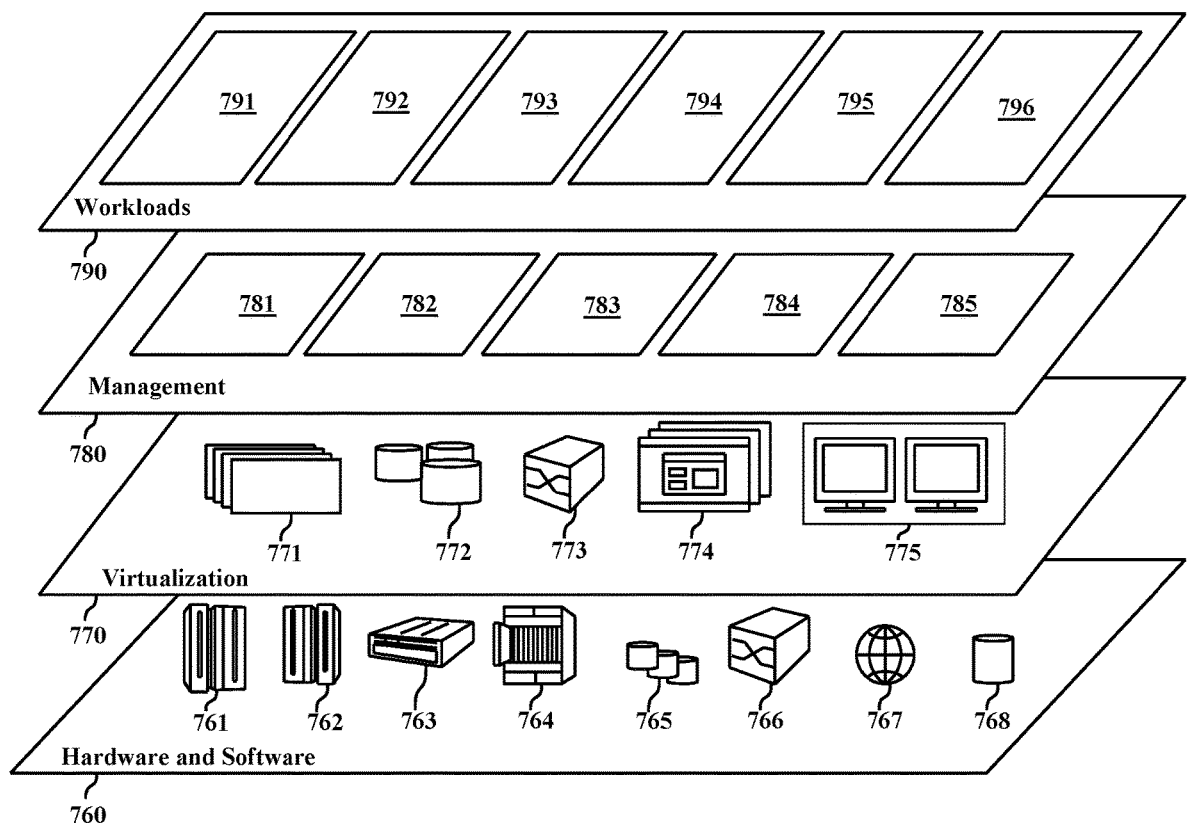
FIG. 7 illustrates abstraction model layers according to an embodiment of the invention.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and topic model processing 796.

The process software is shared, simultaneously serving multiple customers in a flexible, automated fashion. It is standardized, requiring little customization, and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time, such as minutes, seconds, and hours, on the central processor of the server. Additionally, the accessed server may make requests of other servers that require CPU units. CPU units are an example that represents but one measurement of use. Other measurements of use include, but are not limited to, network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use, such as network bandwidth, memory usage, storage usage, etc., approach a capacity so as to affect performance, additional network bandwidth, memory usage, storage, etc. are added to share the workload.

The measurements of use employed for each service and customer are sent to a collecting server that sums the measurements of use for each customer for each service that was processed anywhere in the network of servers that provide the shared execution of the process software. The summed measurements of use units are periodically multiplied by unit costs, and the resulting total process software application service costs are alternatively sent to the customer and/or indicated on a web site accessed by the customer, who may then remit payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 8:
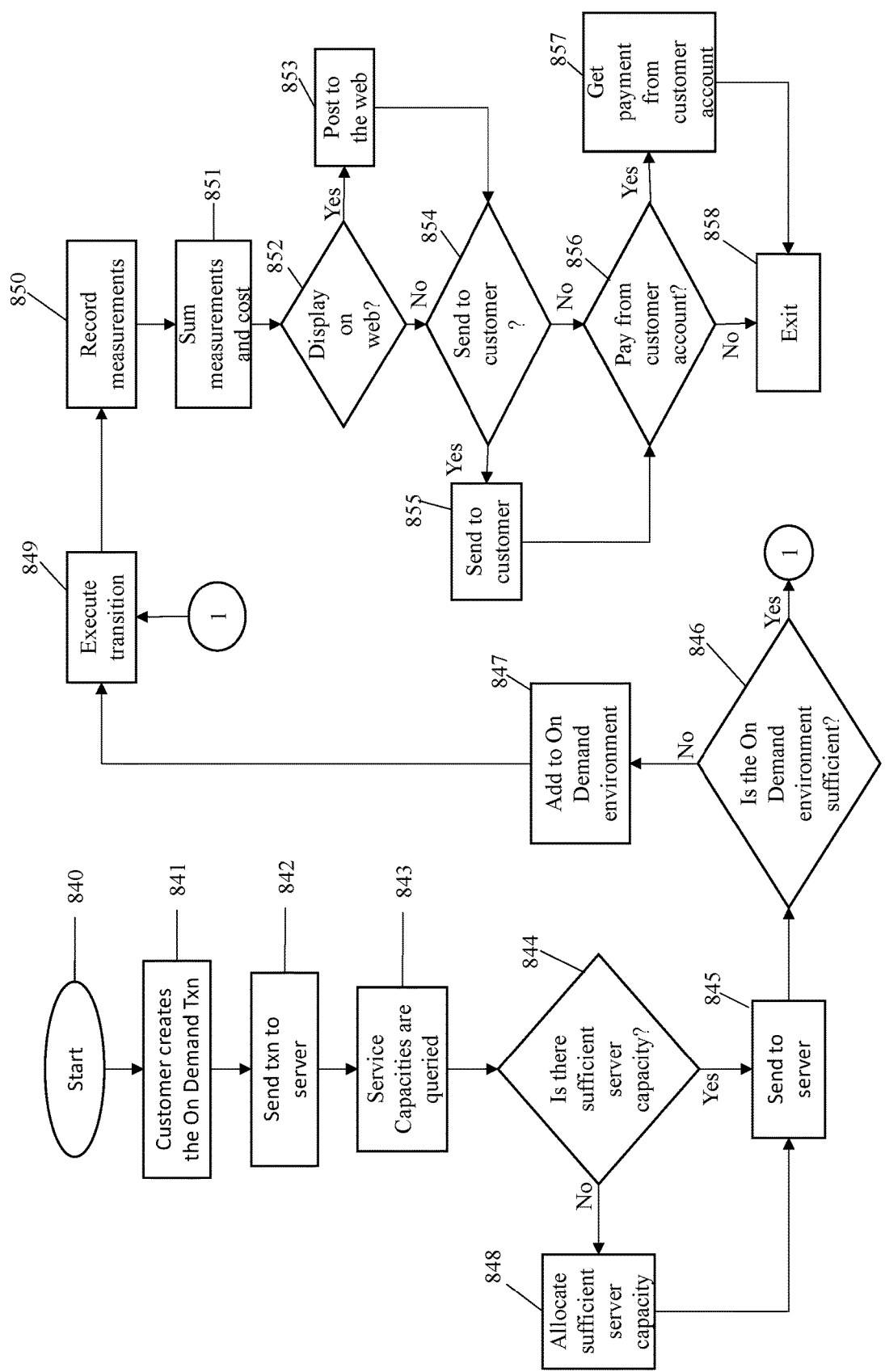
FIG. 8 illustrates an on demand method according to an embodiment of the invention.

With reference to FIG. 8, step 840 begins the On Demand process. A transaction is created that contains the unique customer identification, the requested service type, and any service parameters that further specify the type of service (841). The transaction is then sent to the main server (842). In an On Demand environment, the main server can initially be the only server, and then as capacity is consumed other servers are added to the On Demand environment.

The server central processing unit (CPU) capacities in the On Demand environment are queried (843). The CPU requirement of the transaction is estimated, and then the server's available CPU capacity in the On Demand environment is compared to the transaction CPU requirement to see if there is sufficient CPU available capacity in any server to process the transaction (844). If there is not sufficient server CPU available capacity, then additional server CPU capacity is allocated to process the transaction (848). If there was already sufficient available CPU capacity, then the transaction is sent to a selected server (845)

Before executing the transaction, a check is made of the remaining On Demand environment to determine if the environment has sufficient available capacity for processing the transaction. This environment capacity consists of such things as, but not limited to, network bandwidth, processor memory, storage etc. (846). If there is not sufficient available capacity, then capacity will be added to the On Demand environment (847). Next the required software to process the transaction is accessed, loaded into memory, and then the transaction is executed (849).

The usage measurements are recorded (850). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs, and then recorded as a charge to the requesting customer (851).

If the customer has requested that the On Demand costs be posted to a web site (852), then they are posted thereto (853). If the customer has requested that the On Demand costs be sent via e-mail to a customer address (854), then they are sent (855). If the customer has requested that the On Demand costs be paid directly from a customer account (856), then payment is received directly from the customer account (857). On Demand process proceeds to (858) and exits.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of extracting jargon from a document corpus stored in a database using a user interface and a processor with a review module, a separation module, a topic model module, a similarity score module, and a term extraction module, the method comprising:
   receiving a sub-domain input by the processor through the user interface to initiate a review by the review module of the document corpus stored in the database;
   separating the document corpus with the separation module into at least one sub-corpus and a remainder corpus by the processor, the at least one sub-corpus defined by the sub-domain input, the remainder corpus defined by the document corpus less the at least one sub-corpus;
   building a first topic model using the topic model module to evaluate at least one term extracted from the at least one sub-corpus and a second topic model using the topic model module to evaluate the at least one term extracted from the remainder corpus;
   generating a first topic similarity score with the similarity score module for a select one of the at least one term by the first topic model based on a first meaning of the select term as used in the at least one sub-corpus and a second topic similarity score with the similarity score module for the select term by the second topic model based on a second meaning of the select term as used in the remainder corpus;
   comparing the first and second topic similarity scores by the term extraction module, wherein, for the select term, as a result of a corresponding difference between the first and second topic similarity scores for the select term in the sub-corpus measured against the select term in the remainder corpus being greater than a predetermined threshold, the select term is identified as a jargon term; and
   providing a list of jargon terms including the jargon term through the user interface.

2. The method according to claim 1, further comprising:
   ranking the at least one jargon term according to a minimum difference between the respective topic similarity scores of the first topic model and the second topic model; and
   providing a document cluster from the at least one sub-corpus, each document in the document cluster including the at least one jargon term from the list of jargon terms.

3. The method according to claim 2, further comprising:
   selecting the document cluster from the at least one sub-corpus; and tagging the document cluster to correspond to the sub-domain input.

4. The method according to claim 1, wherein separating the document corpus into the at least one sub-corpus and the remainder corpus further includes:
defining the at least one sub-corpus by at least one of a distributional semantic method or individual user selection.

5. The method according to claim 4, further comprising associating an individual document with a plurality of sub-corpora.

6. The method according to claim 4, wherein the distributional semantic method includes:
building an initial topic model from the document corpus to provide the at least one sub-corpus; and
filtering documents in the at least one sub-corpus according to select parameters to define a condensed corpus.

7. The method according to claim 6, wherein building the initial topic model further includes:
selectively excluding a document term from the initial topic model when the document term is at least one of functional or comprises a frequency count below a pre-determined minimum.

8. The method according to claim 7, wherein building the initial topic model further includes:
selectively excluding a document from the initial topic model when fewer than a select number of terms in the document exceed the pre-determined minimum frequency count.

9. The method according to claim 6, wherein providing the at least one sub-corpus includes:
obtaining a vector for the sub-domain input from the initial topic model;
mapping document terms to corresponding vectors in the initial topic model to determine an initial topic similarity score relative to the sub-domain input; and
providing at least one document where the initial topic similarity score exceeds a particular value for a select number of terms in the at least one document.

10. The method according to claim 9, wherein obtaining the vector for the sub-domain input further includes:
at least one of locating the sub-domain input or averaging the corresponding vectors of each mapped document term to provide an aggregate vector for the at least one document; and
including the at least one document in the condensed corpus when a distance between the aggregate vector and the sub-domain input vector is less than a select minimum distance.

11. The method according to claim 9, wherein obtaining the vector for the sub-domain input further includes:
using a proxy vector when the sub-domain input is not found in the initial topic model, the proxy vector defined by averaging vectors of few alternative terms significant to the sub-domain input; and
including the at least one document in the condensed corpus when a distance between the proxy vector and an aggregate vector is less than the select minimum distance.

12. The method according to claim 6, further comprising extracting terms from each of the at least one sub-corpora independently of each other.

13. The method according to claim 12, further comprising extracting the at least one term by at least one of term frequency-inverse document frequency, residual inverse document frequency, term frequency, average term frequency, chi-square, c-value, mapping the at least one term to an embedding, or comparing term frequency in the at least one sub-corpus to term frequency in the remainder corpus.

14. The method according to claim 12, further comprising:
building the first topic model to evaluate the at least one term from the condensed corpus; and
building the second topic model to evaluate the at least one corresponding term from the document corpus less the condensed corpus.

15. The method according to claim 14, wherein identifying the at least one jargon term further includes:
defining the respective topic similarity scores based on the condensed corpus and the document corpus less the condensed corpus; and
filtering non-jargon terms defined by a minimum difference between the respective topic similarity scores being below a pre-determined threshold.

16. The method according to claim 15, further comprising:
identifying at least one of a characteristic or usage of non-filtered terms that is different in the condensed corpus than in the document corpus less the condensed corpus, the at least one of the characteristic or usage being indicative of the at least one jargon term.

17. The method according to claim 16, further comprising:
reducing the ranking of the at least one jargon term when at least one of a frequency count of the at least one jargon term is higher in an alternative sub-domain or a difference between the frequency count of the sub-domain and the alternative sub-domain is less than a select threshold.

18. A system for extracting jargon from a document corpus, the system comprising:
a database storing the document corpus;
an interface electrically connected to said database, said interface configured to receive a request to initiate a review of the document corpus based on a sub-domain input and provide a list of jargon terms; and
a processor in communication with said database and said interface, said processor having
a review module configured to review the document corpus in response to an initiation by said interface;
a separation module configured to separate the document corpus into at least one sub-corpus defined by the sub-domain input and a remainder corpus defined by the document corpus less the at least one sub-corpus;
a topic model module configured to build a first topic model to evaluate at least one term extracted from the at least one sub-corpus and a second topic model to evaluate the at least one term extracted from the remainder corpus;
a similarity score module configured to generate and compare a first topic similarity score for a select one of the at least one term by the first topic model based on a first meaning of the select term as used in the at least one sub-corpus and a second topic similarity score by the second topic model based on a second meaning of the select term as used in the remainder corpus, wherein, for the select term, as a result of a corresponding difference between the first and second topic similarity scores for the select term in the sub-corpus measured against the select term in the remainder corpus being greater than a predetermined threshold, the select term is identified as a jargon term; and a term extraction module configured to extract the jargon term to provide a list of jargon terms including the jargon term through the user interface.

19. A computer program product for extracting jargon from a document corpus, the computer program product comprising:
   a computer readable storage medium having stored thereon:
   first program instructions executable by a processor to cause the processor to receive a sub-domain input to initiate a review of the document corpus stored in the database;
   second program instructions executable by the processor to cause the processor to separate the document corpus into at least one sub-corpus and a remainder corpus, wherein the at least one sub-corpus defined by the sub-domain input and the remainder corpus defined by the document corpus less the at least one sub-corpus;
   third program instructions executable by the processor to cause the processor to build a first topic model to evaluate at least one term extracted from the at least one sub-corpus and a second topic model to evaluate the at least one term extracted from the remainder corpus;
   fourth program instructions executable by the processor to cause the processor to generate a first topic similarity score with the similarity score module for a select one of the at least one term by the first topic model based on a first meaning of the select term as used in the at least one sub-corpus and a second topic similarity score with the similarity score module for the select term by the second topic model based on a second meaning of the select term as used in the remainder corpus;
   fifth program instructions executable by the processor to cause the processor to compare the first and second topic similarity scores, wherein, for the select term, as a result of a corresponding difference between the first and second topic similarity scores for the select term in the sub-corpus measured against the select term in the remainder corpus being greater than a predetermined threshold, the select term is identified as a jargon term; and
   sixth program instructions executable by the processor to cause the processor to provide a list of jargon terms including the jargon term through a user interface.

20. The computer program product according to claim 19, further comprising seventh program instructions executable by the processor to cause the processor to identify the at least one jargon term by at least one of filtering the extracted terms when a minimum difference between the respective topic similarity scores is below a pre-determined threshold or identifying at least one of a characteristic or usage of the extracted terms that is different in the sub-corpus than in the remainder corpus.

* * * * *